W. SPEER.
CALIPERS.
APPLICATION FILED MAY 9, 1911.
1,007,400.
Patented Oct. 31, 1911.
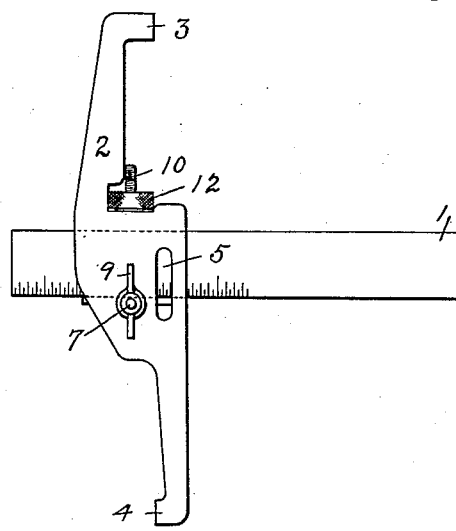
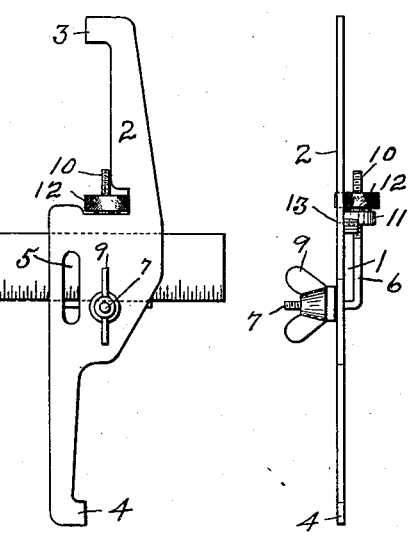
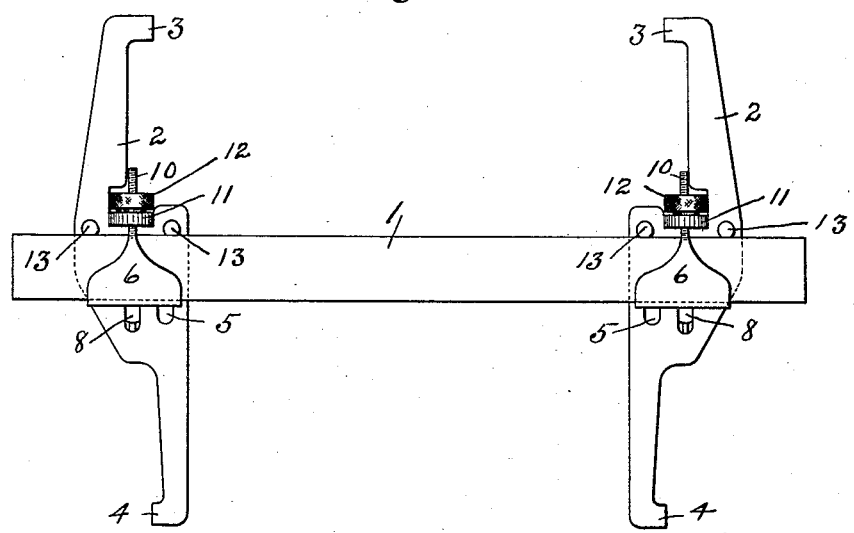
Witnesses:—
Jean Joyce
Henry Watro
Inventor.
William Speer
By Chapin & Ferguson
Attorney

UNITED STATES PATENT OFFICE.

WILLIAM SPEER, OF BALTIMORE, MARYLAND.

CALIPERS.

1,007,400.      Specification of Letters Patent.      Patented Oct. 31, 1911.

Application filed May 9, 1911. Serial No. 626,075.

*To all whom it may concern:*

Be it known that I, WILLIAM SPEER, a citizen of the United States, residing at Baltimore, in the State of Maryland, have invented certain new and useful Improvements in Calipers, of which the following is a specification.

This invention relates to improvements in calipers and has for its object to provide a simple and efficient device by means of which the inside and outside measurements can be taken at the same time, and which is adapted to be used on various sizes of scales.

The invention consists of the novel construction and arrangement of the parts and combination of parts hereinafter more fully set forth in the specification and pointed out in detail in the claims.

In the accompanying drawing,—Figure 1 is a front elevation of my invention. Fig. 2 is an end view of Fig. 1. Fig. 3 is a rear elevation of same.

Referring to the accompanying drawings, forming part of this specification, and in which like reference numerals designate like parts throughout the several views thereof, 1 designates a metal scale on which is slidably mounted the two legs 2. These legs 2 are each provided with inwardly-projecting upper ends 3 which are on a vertical line with the outwardly-projecting lower ends 4. The outside measurements being taken between the upper ends 3 and the inside measurements between the lower ends 4. These legs 2 are each also provided with a slot 5, one side of which latter is on a vertical line with the upper and lower ends 3 and 4, and through which the inside and outside measurements may be read on the scale 1. The legs 2 are held to the scale 1 by the clamps 6, the lower ends 7 of which latter are bent at right angles and project through the apertures 8 and are screw-threaded and provided with the thumb-screws 9. The upper ends 10 of the said clamps 6 project through the shoulders 11 on the legs 2 and are screw-threaded and provided with the nuts 12. The legs 2 are also provided with laterally-projecting lugs 13 against which the upper edge of the scale impinges when the legs are secured in position thereon.

When it is desired to take the inside or outside measurement as the case may be, one of the legs 2 is set in the desired position on the scale and securely fastened thereon by the clamp 6, as described. The other leg is then moved along the scale until the desired measurement is taken and is then securely fastened on the scale by the clamp 6 as described. The apertures 8 are sufficiently long to permit the legs 2 being mounted upon various sizes of scales.

Having thus described my invention, what I claim is:

1. A pair of calipers comprising a scale, a pair of legs each having a laterally projecting shoulder and slidably mounted on said scale and each having the measuring edge of one end thereof in line with the measuring edge of the other end and a slot having one edge in line with said measuring edges, two adjustable clamps each having one end screw-threaded and projecting through the said shoulder on said legs and provided with a nut on the outer end, and its other end bent at right angles and projecting through an elongated slot in said legs and each provided with a thumb-screw.

2. A pair of calipers comprising a scale, a pair of legs slidably mounted on said scale and each having the measuring edge of one end in vertical line with the measuring edge of the other end and a slot having one edge in line with said measuring edges, two laterally projecting lugs on each of said legs, two adjustable clamps each having one end screw-threaded and projecting through a shoulder on said legs and provided with a nut on the outer end and its other end bent at right angles and projecting through an elongated slot in said legs and each provided with a thumb-screw.

In testimony whereof I affix my signature in presence of two witnesses.

WILLIAM SPEER.

Witnesses:
     CHAPIN A. FERGUSON,
     HENRY WATSON.

---

Copies of this patent may be obtained for five cents each, by addressing the "Commissioner of Patents, Washington, D. C."